United States Patent [19]
Ordish et al.

[11] Patent Number: 5,727,165
[45] Date of Patent: Mar. 10, 1998

[54] OFFER MATCHING SYSTEM HAVING TIMED MATCH ACKNOWLEDGMENT

[75] Inventors: Christopher J. Ordish, Virginia Water; John M. Richards, Didcot, both of England; Clifford A. Mackenzie, Dix Hills, N.Y.

[73] Assignee: Reuters Limited, England

[21] Appl. No.: 364,009

[22] Filed: Dec. 27, 1994

Related U.S. Application Data

[63] Continuation of Ser. No. 788,575, Nov. 6, 1991, abandoned.

[30] Foreign Application Priority Data

| Dec. 17, 1990 | [GB] | United Kingdom | 9027249 |
| Feb. 27, 1991 | [GB] | United Kingdom | 9104121 |
| Jul. 5, 1991 | [GB] | United Kingdom | 91306146 |

[51] Int. Cl.$^6$ .................................................. G06F 17/60
[52] U.S. Cl. ........................................................ 395/237
[58] Field of Search ............................................. 395/237

[56] References Cited

U.S. PATENT DOCUMENTS

| 3,335,231 | 8/1967 | Gray et al. | 379/81 |
| 3,465,298 | 9/1969 | La Duke et al. | 364/474.01 |
| 3,573,747 | 4/1971 | Adams et al. | 364/408 |

(List continued on next page.)

FOREIGN PATENT DOCUMENTS

| 0 343 820 | 11/1989 | European Pat. Off. . |
| 0 416 482 A3 | 8/1990 | European Pat. Off. . |
| 0 411 748 | 2/1991 | European Pat. Off. . |
| 0 512 702 | 11/1992 | European Pat. Off. . |
| 1489571 | 10/1977 | United Kingdom . |
| 1489573 | 10/1977 | United Kingdom . |

OTHER PUBLICATIONS

Quotron F/X Trader—Introduction, published 1990 by Quotron Systems Inc.
Quotron F/X Trader—System Overview, published 1990 by Quotron Systems Inc.
Using F/X Trader, published 1990 by Quotron Systems Inc.
Quotron F/X Trader User Manual, Beta Version, published 1990 by Quotron Systems Inc.
DECnet Digital Network Architecture (Phase III), Network Services Protocol (NSP) Functional Specification, pp. 82 and 85, Oct. 1980.
DECnet for Open VMS Components and Concepts, Sections 2.5. and 3.8.3.1.
Dictionary of Computing, OUP, p. 368, 1983.

(List continued on next page.)

*Primary Examiner*—Gail O. Hayes
*Assistant Examiner*—Steven R. Yount

[57] ABSTRACT

An improved matching system for trading instruments in which the occurrence of automatically confirmed trades is dependent on receipt of match acknowledgement messages by the host computer (200) from all counterparties (KS A, KS B) to the matching trade. The host computer (200) matches like bids and offers provided thereto by the various keystations (KS A, KS B) in accordance with a predetermined matching criteria. Each of the keystations (KS A, KS B) includes a trade status timer (300, 302) and a display (310, 312) for timing receipt of a confirmed trade and/or ticket generation message from the host (200) after the keystation (KS A, KS B) has sent a match acknowledgement message and for displaying an "unconfirmed trade" status message awaiting receipt of the "confirmed trade" indication from the host (200). An alarm and a display message is provided at the keystation (KS A, KS B) when the "confirmed trade" indication is not timely received. The host (200) receives match acknowledgement messages from all of the counterparties (KS A, KS B) to the match before confirming a trade. A ticket is not generated at the keystation (KS A, KS B) until the trade has been confirmed by the host (200).

48 Claims, 5 Drawing Sheets

U.S. PATENT DOCUMENTS

| | | | |
|---|---|---|---|
| 3,574,747 | 4/1971 | Adams et al. | |
| 3,581,072 | 5/1971 | Nymeyer | 364/408 X |
| 3,626,385 | 12/1971 | Bouman | 364/474.01 |
| 3,728,488 | 4/1973 | Bonsky et al. | 379/81 |
| 3,745,529 | 7/1973 | Engle | 371/62 |
| 3,795,800 | 3/1974 | Nimmo | 371/16.3 |
| 3,829,842 | 8/1974 | Langdon et al. | 364/474.01 |
| 4,114,027 | 9/1978 | Slater et al. | |
| 4,114,029 | 9/1978 | Slater et al. | 235/419 |
| 4,276,593 | 6/1981 | Hansen | 364/184 |
| 4,302,810 | 11/1981 | Bouricius et al. | 380/24 |
| 4,369,493 | 1/1983 | Kronenberg | 395/550 |
| 4,376,978 | 3/1983 | Musmanno | |
| 4,382,810 | 5/1983 | Wood | 65/29 |
| 4,404,551 | 9/1983 | Howse et al. | 340/711 |
| 4,410,889 | 10/1983 | Bryant et al. | 340/825.2 |
| 4,412,287 | 10/1983 | Braddock, III | 364/408 |
| 4,486,853 | 12/1984 | Parsons | 395/275 |
| 4,525,779 | 6/1985 | Davids et al. | 395/153 |
| 4,531,184 | 7/1985 | Wigan et al. | 395/153 |
| 4,625,276 | 11/1986 | Benton et al. | 364/408 |
| 4,674,044 | 6/1987 | Kalmus et al. | 364/408 |
| 4,677,552 | 6/1987 | Sibley, Jr. | 364/408 |
| 4,713,811 | 12/1987 | Frey | 371/8.2 |
| 4,745,559 | 5/1988 | Willis et al. | |
| 4,750,135 | 6/1988 | Boilen | |
| 4,789,928 | 12/1988 | Fujisaki | 364/401 |
| 4,805,204 | 2/1989 | Hashimoto | 379/71 |
| 4,833,616 | 5/1989 | Takei et al. | 364/473 |
| 4,868,865 | 9/1989 | Ogawa et al. | 379/100 |
| 4,876,652 | 10/1989 | Gardner | 364/473 |
| 4,897,857 | 1/1990 | Wakatsuki et al. | 375/76 |
| 4,903,201 | 2/1990 | Wagner | 364/408 |
| 4,926,325 | 5/1990 | Benton et al. | 364/408 |
| 4,930,093 | 5/1990 | Houser et al. | 364/551.01 |
| 4,960,981 | 10/1990 | Benton et al. | 235/379 |
| 4,980,826 | 12/1990 | Wagner | 364/408 |
| 5,003,473 | 3/1991 | Richards | 364/408 |
| 5,012,426 | 4/1991 | Harada et al. | 364/476 |
| 5,038,284 | 8/1991 | Kramer | 364/408 |
| 5,077,665 | 12/1991 | Silverman et al. | 364/408 |
| 5,097,470 | 3/1992 | Gihl | 371/62 |
| 5,130,993 | 7/1992 | Gutman et al. | 371/42 |
| 5,136,501 | 8/1992 | Silverman et al. | 364/408 |
| 5,146,598 | 9/1992 | Takezawa | 395/725 |
| 5,168,446 | 12/1992 | Wiseman | 364/408 |
| 5,305,200 | 4/1994 | Hartheimer et al. | |
| 5,375,055 | 12/1994 | Togher et al. | 395/232 |

OTHER PUBLICATIONS

T. Gunton, A Dictionary of Information Technology and Computer Science, NCC Blackwell, pp. 183–184, 1990.

H. Nussbaumer, Computer Communication Systems, vol. 1, pp. 141–2, 216–9, and 232–2, John Wiley, 1987.

Handbook of Computer–Communications, vol. 3, Second Edition, Howard W. Sams & Co., 1989.

"Flying High with Financial Databases," Donald P. Mazzella, Wall Street Computer Review, Jun. 1985, pp. 36–44.

"The Computer That Ate Chicago," Saul Hansell, Institutional Investor, Feb. 1989, pp. 180–188.

"Future Shock if Ratting the Futures Pits," Kathleen A. Behof and Jeffrey Rothfeder, Business Week, Apr. 17, 1989, pp. 93–94.

"Global Custody: Take a Journey to 1992," Clarisse M. Persanyi, ABA Banking Journal, May 1990, pp. 96, 100.

Copy of European Search Report for European Counterpart Application.

Welles, C., "The Computer Assault on New York's Foreign Exchange Market," *Institutional Investor*, Mar. 1976, pp. 32–36.

Brown, J., "USE Automates with Matchmaker," *Computing Canada*, Aug. 4, 1988, pp. 12 and 42.

Norris, F., "Computers for the Futures Pits," *The New York Times*, Feb. 13, 1989, p. D1.

"The Swiss Connection," *Asian Finance*, Feb. 15, 1988, pp. 22–23.

J–P Banâtre et al., "The Design and Building of Enchere, a Distributed Electronic Marketing System", Communications of the Association for Computer Mahinery, pp. 19–29, vol. 29, No. 1, New York, USA, Jan. 1986.

ACF Flow Diagram for Client Site

For each match notification that arrives:

If Tn for any notification exceeds 15 seconds:

When a match confirmation message (the ticket) arrives:

ACF Flow Diagrams for Host Site

When a match is made at the host:-

When a Match Acknowledgement Arrives Back From a Client Site

If Tm Exceeds 60 Seconds :-

OFFER MATCHING SYSTEM HAVING TIMED MATCH ACKNOWLEDGMENT

CROSS-REFERENCE TO RELATED APPLICATIONS

This applications is a continuation of application Ser. No. 07/788,575, filed Nov. 6, 1991, now abandoned.

This application is related to the commonly owned U.S. patent applications entitled "Distributed Matching System," filed May 25, 1989, bearing U.S. Ser. No. 357,036, now U.S. Pat. No. 5,077,665; issued Dec. 13, 1991; "Distributed Matching System Method," filed May 25, 1989, bearing U.S. Ser. No. 357,484; "Anonymous Matching System," filed May 26, 1989, bearing U.S. Ser. No. 357,478, now U.S. Pat. No. 5,136,501, issued Aug. 4, 1992; "Integrated Trading System," filed Nov. 22, 1989, bearing U.S. Ser. No. 440,971; and "Integrated Trading System Method," filed Nov. 22, 1989, bearing U.S. Ser. No. 441,156; and U.S. Pat. No. 5,003,473, issued Mar. 26, 1991 and entitled "Trading Ticket Output System," the contents of all of which are specifically incorporated by reference herein in their entirety, and is an improvement thereon.

TECHNICAL FIELD

The present invention relates to matching systems for effectuating trades of trading instruments through automatic matching in which buyers and sellers who are willing to trade with one another based on specified criteria may automatically trade when matching events occur satisfying these criteria, and more particularly to improvements in such matching systems in which risks are minimized as to losses due to broken trades.

BACKGROUND ART

Information retrieval systems for financial information, such as stock market type of information and money market information, normally employ a transfer of data in a high-performance, real-time information retrieval network in which update rates, retrieval rates and subscriber and/or user population are generally very high. An example of such a system is assignee's REUTER MONITOR DEALING SERVICE which is used in the foreign exchange or money market. Such systems, while providing rapid video conversation capability, and the ability, in the instance of Reuters' MONITOR DEALING SERVICE, to display a message when a connection is lost during a negotiated trade, are not anonymous systems nor do they provide for automated anonymous trading such as is possible in a matching system. Of course, conversational dealing systems have their place in the market and serve particular needs where appropriate. However, anonymous matching systems are also often desired and, by their very nature, do not normally employ a conversation capability since the parties to the transactions are unknown until the transaction has been completed. Examples of satisfactory prior art video conversational systems for use in connection with trading of financial information are disclosed in commonly owned U.S. Pat. Nos. 4,531,184; 4,525,779 and 4,404,551, by way of example. In this regard, U.S. Pat. No. 4,525,779 discloses a feature termed a DEAL KEY for providing a visual confirmation signal during a negotiated trade but does not concern itself with the problems of anonymous matching trades and the types of confirmations required therein to complete a deal in which risks are minimized as to losses due to broken trades.

Prior art examples of matching systems used in connection with the trading of trading instruments are disclosed in U.S. Pat. No. 4,412,287, and U.K. Patent Nos. 1,489,571 and 1,489,573, all of which disclose automatic stock exchanges in which a computer matches buy and sell orders for a variety of stocks; U.S. Pat. No. 3,573,747, which discloses an anonymous trading system for selling fungible properties between subscribers to the system; U.S. Pat. No. 3,581,072, which discloses the use of a special purpose digital computer for matching orders and establishing market prices in an auction market for fungible goods; U.S. Pat. No. 4,674,044, which discloses an automatic securities trading system; and U.S. Pat. No. 4,903,201, which discloses an automated computerized, open outcry exchange system for trading commodity contracts through automatic matching. Other such prior art matching systems are SOFFEX, such as described in the Feb. 15, 1988 issue of *Asian Finance* at pages 22–23 TAFEX; such as described in the May 1976 issue of *Institutional Investor* at pages 32–36; and VSE's MATCHMAKER, described in the Aug. 4, 1988 issue of *Competing Canada*, at pages 12, 42. However, none of these prior art matching systems implements or suggests the use of risk controls to minimize risks as to losses due to broken trades, which are situations in which you are not entirely sure which trades have been completed or not due to a failure somewhere in the system, such as a network failure, a control system or host failure, or a keystation failure, all of which could result in one party thinking a trade or match had occurred while the counterparty was completely unaware of the trade. Applicants' assignee has recently overcome some of these problems in matching systems which it has introduced under the names of GLOBEX, such as described in the Feb. 13, 1989 issue of the *New York Times* at pages D1, D6, and REUTER DEALING 2000 Automatic FX Matching network. However, these systems have involved a transaction desk in which trades had to be "voted upon" automatically at a site remote to the host computer and to the individual keystations before ultimately becoming completed trades. Such an arrangement lacks many of the advantages of the invention herein, particularly in the type of dynamic environment in which such matching systems are normally employed. Moreover, no prior art distributed anonymous matching systems are known to applicants in which broken trade alerts are timely provided when a system failure occurs after a match which prevents immediate notification to all counterparties of confirmation of the trade. Furthermore, no such prior art matching systems are known to applicants in which the timing of responses to positive match acknowledgements are utilized by the keystations attempting to avoid broken trades. This is so despite the well known monitoring of computer signals to detect communication faults, such as disclosed in U.S. Pat. Nos. 3,745,800; 4,276,593; 4,625,276; 4,789,928; and 4,713,811.

Nevertheless, in anonymous matching systems, such as described in U.S. patent application Ser. No. 357,478, filed May 26, 1989, now U.S. Pat. No. 5,136,501, issued Aug. 4, 1992 and incorporated by reference herein, there can be a problem when one communication channel fails during the matching transaction. It may occur that although confirmation is sent to one keystation or counterparty and acknowledged, the other counterparty to the matching transaction which occurred at the host does not receive details of the contract and/or his acknowledgement does not reach the host computer or central system. If the communication channel which fails is that of the purchaser and failure occurs after he has made his offer to buy but before he receives an acceptance, the seller will have offered to sell, will have received details of the contract from the host or central system and will have acknowledged receipt of the host or central system so that as far as the seller is concerned, the contract or deal is complete. The buyer will have received details of the offer from the host or central system and have made his acceptance or an alternative offer to buy but due to the channel failure he will not have received any details of the contract. He will be uncertain of his position and may assume that his acceptance was too late or his offer to buy has not been accepted and consider the deal or contract not made. This will leave the host or central system and the buyer at odds, and if the terms of business are appropriate, it may be that the host or central system has to purchase the items from the seller and attempt to sell them in the market itself, possibly at a loss, if the buyer has considered the contract not made.

The present invention attempts to overcome these problems of the prior art by providing a time lapse generator or trade status timing system at each keystation. If desired, a time lapse generator can also be provided at the host or central station, for timing receipt of match acknowledgement signals after match notification by the host. If a client or keystation is making an offer to sell, his offer to sell is transmitted to the host computer or central station as in the aforementioned U.S. application Ser. No. 357,478, now U.S. Pat. No. 5,136,501, issued Aug. 4, 1992, by way of example, and when a deal is matched, details of the amount offered for purchase are sent back to the selling client or keystation who provides a match acknowledgement message to the host computer. The time lapse is generated at the client or keystation following the receipt of a message from the host or central system and will in due course generate an alarm if within a predetermined time lapse period a further message is not received back from the host or central system indicating a confirmed trade, such as along with a ticket generation message. The time lapse is preferably started by the receipt and storage of a message but it could be started by the transmission of an outgoing message. If the time lapse generator is not stopped within a predetermined time, the alarm is generated and the keystation is alerted that the deal is denoted as suspect, requiring further checking with the other party or with the host or central station before it can be considered binding.

It may be arranged in the improved matching system of the present invention that the identity of the other party to the matching transaction is not revealed at the initial message sending stage. In such an instance, when an alarm is raised, the client or relevant keystation is simply informed that his deal is not fully confirmed and that further checking is required. Since he does not know the identity of the other party, he clearly cannot check with him but instead can check with a central enquiry station who would then check with the other party and report back to the enquiring party that the deal is either confirmed or cancelled. It could also be arranged, if desired, in the improved matching system of the present invention, that the identity of the other party is transmitted in the initial message but is simply kept hidden by the display apparatus at the client's keystation until full confirmation is achieved. This latter approach would preferably avoid any problems of a client adopting different modes of enquiry according to the identity of his possible buyer or vendor. In the anonymous system to be described herein by way of example, the details of the other party are only displayed at the final confirmation of the bargain or trade.

As will be described hereinafter, the improved matching system of the present invention overcomes the disadvantages of the prior art in minimizing risks as to losses due to broken trades, such as by ensuring that the occurrence of automatically confirmed trades is dependent on match acknowledgement from all counterparties to the matching trade, and by monitoring trade status of matching transactions

DISCLOSURE OF THE INVENTION

An improved matching system for trading instruments in which the occurrence of automatically confirmed trades is dependent on match acknowledgement from all counterparties to the matching trade. In the system of the present invention, bids for the trading instruments which may be any type of trading instrument such as foreign exchange, stocks, bonds, commodities future contracts, etc., are automatically matched against offers for given trading instruments for automatically providing matching transactions in order to provide confirmed trades for the given trading instruments. The system comprises a host computer or central station for matching like bids and offers provided thereto in accordance with a predetermined matching criteria, a transaction originating keystation or client for providing a bid on a given trading instrument to the system for providing a potential matching transaction, a counterparty keystation or client for providing an offer on the given trading instrument involved in the potential matching transaction, and a network or communications link for interconnecting the host computer, the transaction originating keystation, and the counterparty keystation in the system for enabling data communications therebetween. The host computer comprises match notification data message generation means for providing a match notification data message to the transaction originating keystation and the counterparty keystation via the network in response to the occurrence of a matching transaction at the host computer, which is the central location at which matches automatically take place in accordance with the predetermined matching criteria, such as described in the aforementioned U.S. patent application Ser. No. 357,478, now U.S. Pat. No. 5,136,501, issued Aug. 4, 1992. The match notification data message comprises an unconfirmed matching transaction for the given trading instrument, which is an indication that a match has occurred but that the deal has not been confirmed or completed since all counterparties to the deal have not yet been notified. Match acknowledgement data message generation means are located at each of the keystations for respectively providing a match acknowledgement data message to the host computer via the network in response to receipt of the match notification data message by the transaction originating keystation means and the counterparty keystation, respectively, so that confirmation of the trade, and ultimate ticket generation, can occur. The host computer further comprises confirmed trade data message generation means for providing a confirmed trade data message to the transaction originating keystation and the counterparty keystation via the network in response to receipt of the match acknowledgement data messages from both the transaction originating keystation and the counterparty keystation. The transaction originating keystation and the counterparty keystation each further comprise trade status timing means for timing receipt of the confirmed trade data message by the respective keystation for providing a trade status display at the respective keystation based on the timed receipt of the confirmed trade data message. The trade status timing arrangement is such that an alarm condition is provided to the keystation when the confirmed trade data message is not received within a predetermined time interval, a confirmed trade status display is provided at the keystation if this message is received within this timed interval, and a late confirmed trade status display is provided if this message is received after this timed interval. During this time interval, until a confirmed trade occurs, an unconfirmed trade status display is provided. The host computer may also employ a timing arrangement for timing receipt of the match acknowledgement data messages from the keystations in order to provide an alarm condition to the respective keystation if a match acknowledgement data message has not been timely received from the other party to the trade.

BRIEF DESCRIPTION OF THE DRAWINGS

Examples of the invention will now be described with reference to the accompanying drawings in which.

BEST MODE FOR CARRYING OUT THE INVENTION

Figure 1:
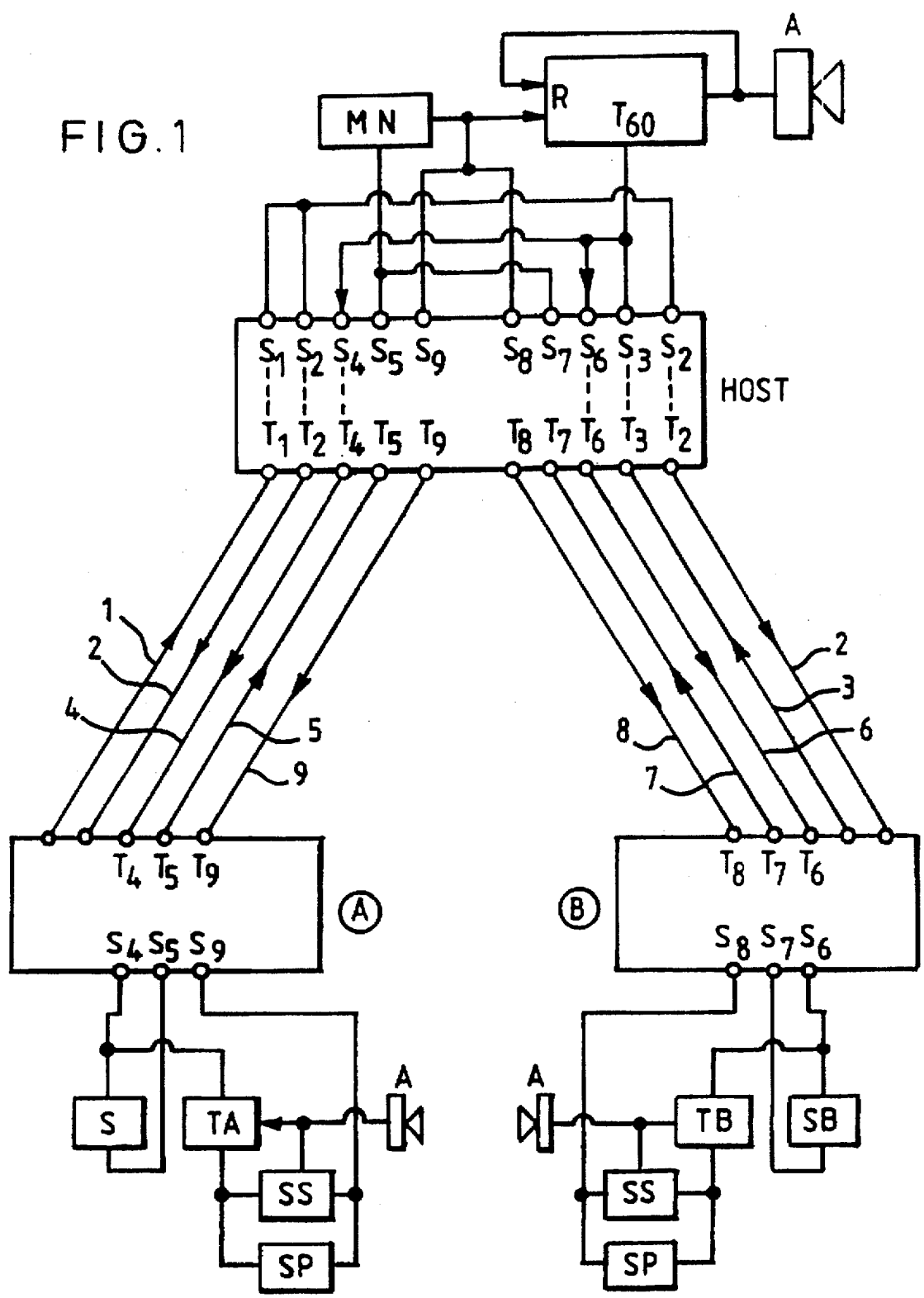
FIGS. 1 and 8 are diagrams of a central station with two client keystations, by way of example, showing the message between, and operations at, each keystation in diagrammatic form in connection with a typical anonymous matching transaction.
Figure 8:
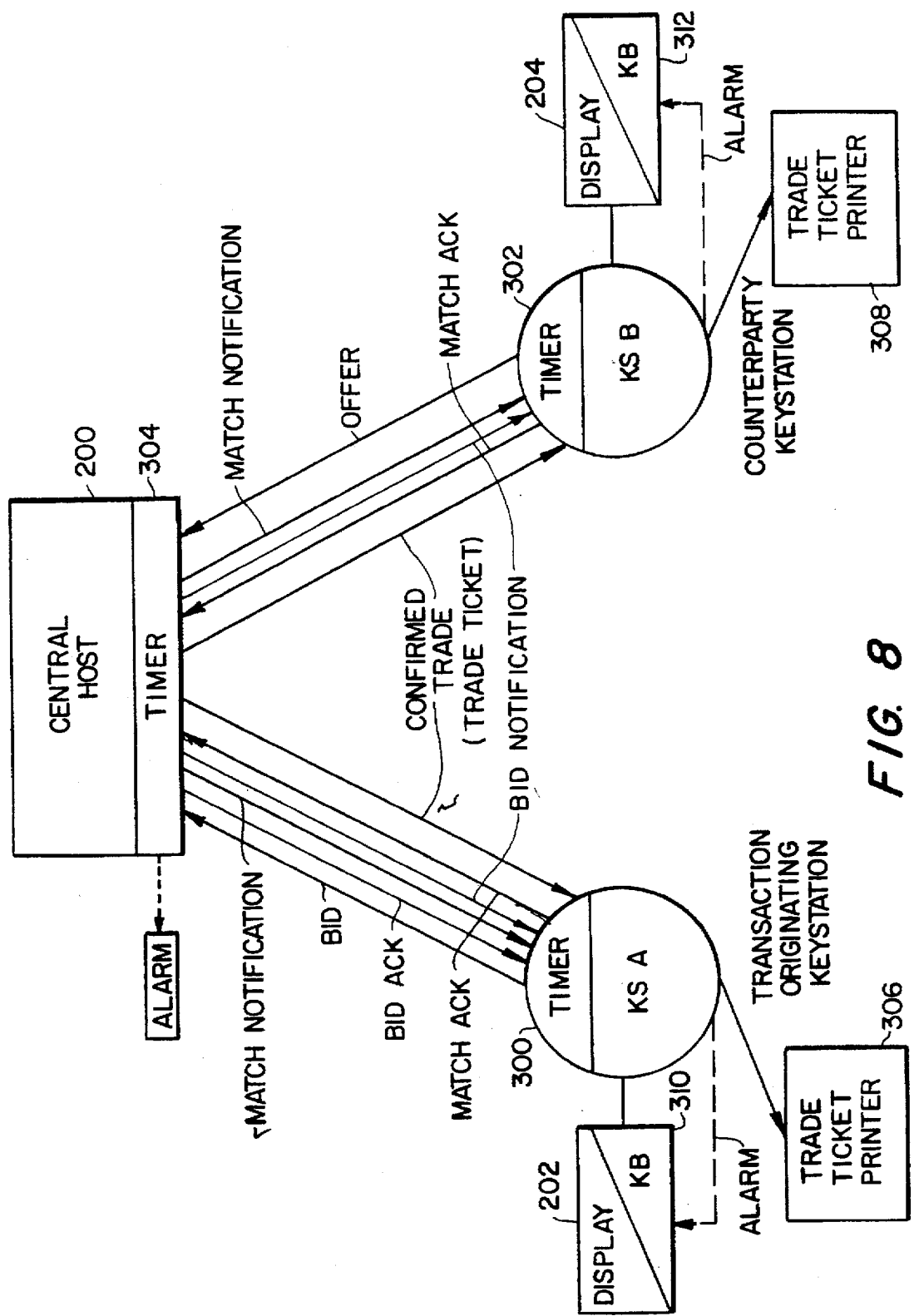

Referring now to the drawings in detail, and initially to FIGS. 1 and 8, the improved matching system of the present invention is shown in diagrammatic form. In this regard, the system of the present invention is generically illustrated in FIG. 1 and is further illustrated, by way of example, in FIG. 8, as an improvement over the anonymous matching system described in U.S. patent application Ser. No. 357,478, now U.S. Pat. No. 5,136,501, issued Aug. 4, 1992, the contents of which are specifically incorporated by reference herein in their entirety. In the message diagram of FIG. 1, various messages are shown as being transmitted between stations in a typical transaction, with the other stations in the network having been omitted for purposes of clarity. Each station can be considered to have a signal terminal S and a message terminal T for each message. For a transmitted message, the operator of the station conventionally causes a signal to be applied to the signal terminal and this causes the message to be conventionally transmitted from T. For a received message, the message is conventionally applied to T and this causes a command signal to be conventionally generated at a separate terminals and message lines are shown for each message, but in practice a single communication channel between the host and a client or keystation will suffice, and separate terminals for each message may not be necessary since the station will, in practice, conventionally receive a message and detect which type of message it is and generate appropriate command signals and apply them to appropriate devices at that station. For ease of understanding, it is convenient to illustrate the system with a plurality of message lines and terminals, even though they may not be separately present in practice.

The connection and operation of the system will generically be described with reference to the situation in which client A (KS A) makes an offer to sell one million of a given trading instrument at a given price and this offer is transmitted as message 1 to the central system known as the host computer 200. This offer is anonymously broadcast as message 2 to all clients or keystations, including client A (KS A) who made the offer and client B (KS B), by the host computer 200. If client B does not wish to buy the full one million of the given trading instrument but makes a counter offer as message 3 to buy one hundred thousand of the trading instrument at that price, the host computer sends a message 4 to client A (KS A) that he has sold one hundred thousand of the trading instrument to client B at the offered price and it sends message 6 to client B (KS B) that he has bought that amount.

Figure 2:
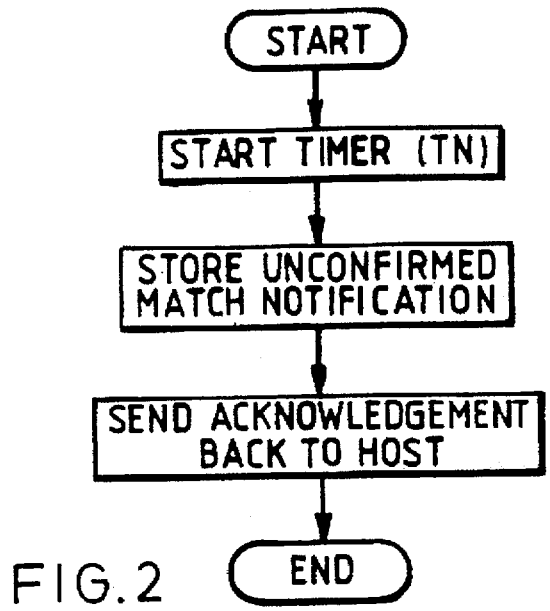
FIGS. 2 to 7 are message flow charts for various events which take place in the systems of FIGS. 1 and 8 in arriving at a confirmed trade in which risks are minimized as to losses due to broken trades.

The receipt of message 4 at terminal T4, in conventional fashion, prompts a command signal at terminal S4 which is fed to two locations. The first location is a conventional data storage device S which stores the message, and after storage causes the sending of a match acknowledgement message 5 from terminal S5 to the host computer 200 of the receipt of the message at client A (KS A). The second location is the timer T which is started. These procedures are diagrammatically indicated by connections in FIG. 1, with the match acknowledgement procedure being illustrated by the flow chart of FIG. 2.

Similarly message 6 received at T6 at client station B (KS B) is conventionally fed to a corresponding conventional data storage device SB and to timer TB from terminal S6; the stored message from SB is returned in a match acknowledgement at S7 and sent back to the host computer 200 as message 7 from terminal T7.

As will be described later, messages 5 and 7 at the host computer 200 preferably prompt the transmission of confirmed trade acknowledgement messages 8 and 9 to the client keystations KS B and KS A, respectively.

Figure 3:
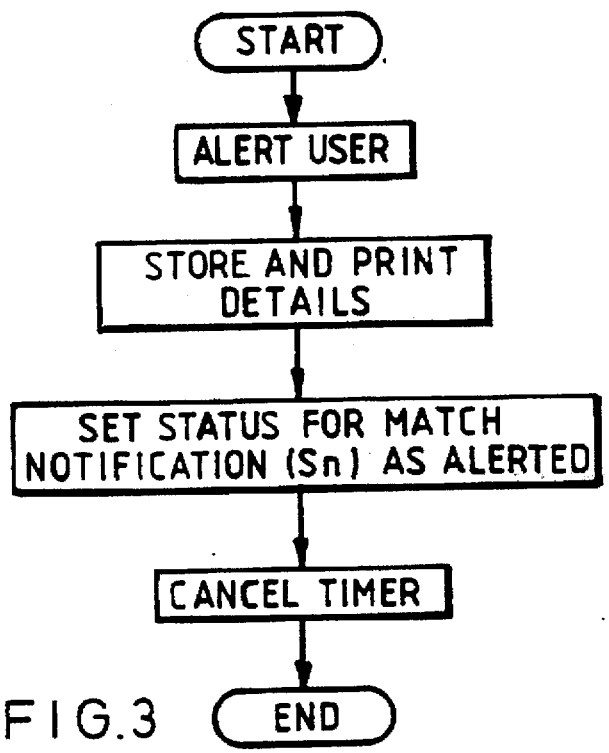
Figure 4:
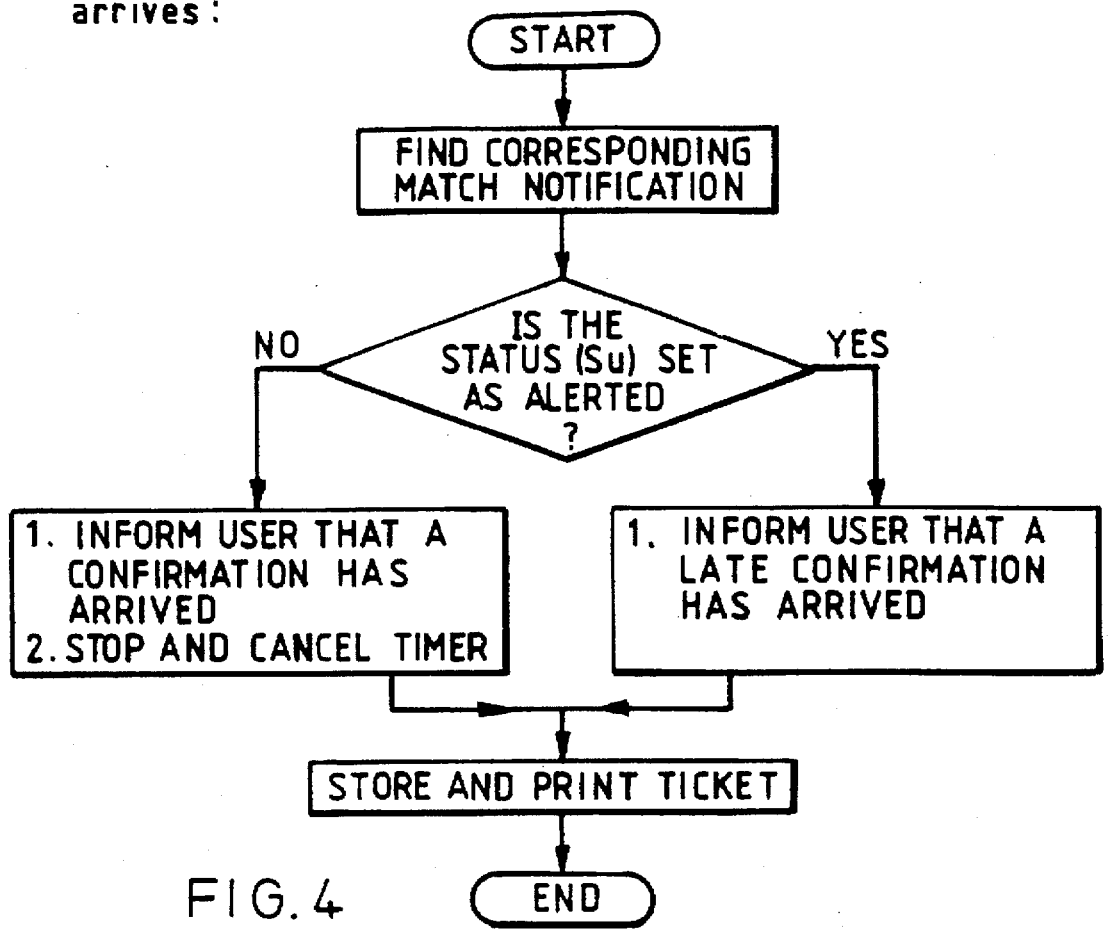

The timers TA and TB preferably have 15 second periods, by way of example, although any other desired timing period may be chosen. At client station A (KS A), if a confirmed trade message 9 is received within this predetermined period, it simply conventionally causes a conventional store and print device (SP) and/or display 202, 204 to store and print the bargain or trade as confirmed and/or to display a confirmed trade status message on the display 202, 204 at the respective keystations KS A, KS B. If the timer reaches the end of its predetermined period before a confirmed trade message 9 has been received, then, preferably the time-out signal is fed firstly to the store and print device (SP) and/or display 202, 204, where it causes the device to store and print and/or display the trade as "unconfirmed" and secondly to the set status device where the status is set to "unconfirmed" which activates an associated alarm to warn the client at the appropriate keystation of the unconfirmed trade, as shown by way of example, in the connections of FIG. 1 and the message flow chart of FIG. 3. If in the above example, the "confirmed trade" message is received after the end of the predetermined 15 second period, the message preferably acts as described above when the message is received within the predetermined 15 second period, but also resets the 'set status' device from "unconfirmed" to "confirmed" which de-activates the alarm and causes a "late confirmed trade" message to be displayed at 202, 204. This is shown by way of example in the message flow chart of FIG. 4.

Figure 5:
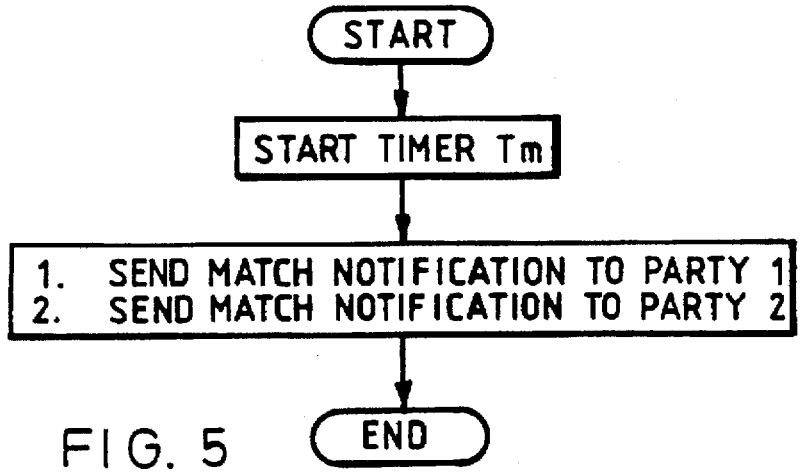
Figure 6:
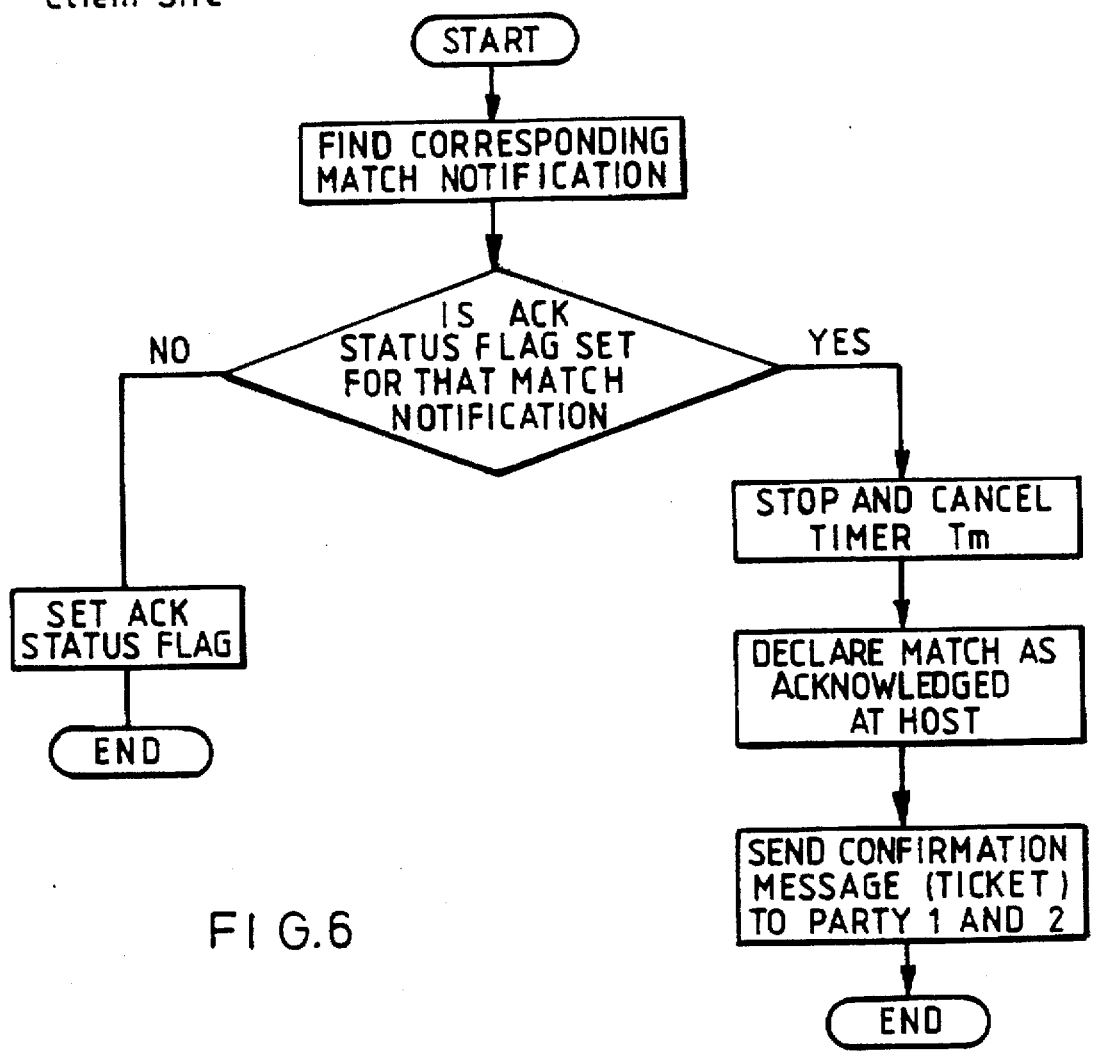

At the host computer 200, if desired, an optional checking system may be provided. In such an instance, the receipt of a message 3 from client B (KS B) offering to buy certain trading instruments at the offered price will prompt a command signal on terminal S3 to operate a timer and also send match notification signals 4 and 6 to the respective clients or keystations via terminals S4, T4, S6 and T6. This is shown by connections in FIG. 1 and, by way of example, is illustrated by the message flow chart of FIG. 5. The match acknowledgement signals 5 and 7 which are received back from the client keystations prompts corresponding command signals at terminals S5 and S7 which will be passed to the match notification store. If the trade has not yet been acknowledged by either party, the first signal preferably causes the store to change to the state of having been acknowledged by one party. If it is already in that state, the receipt of the signal will preferably have three functions; namely, to stop and cancel the timer, to declare the match as fully acknowledged at the host computer 200 and to send confirmation messages 8 and 9 to the respective client keystations via terminals S8, T8, S9 and T9 of a "confirmed trade." This is shown by way of example, in the connections of FIG. 1 and the message flow chart of FIG. 6.

Figure 7:
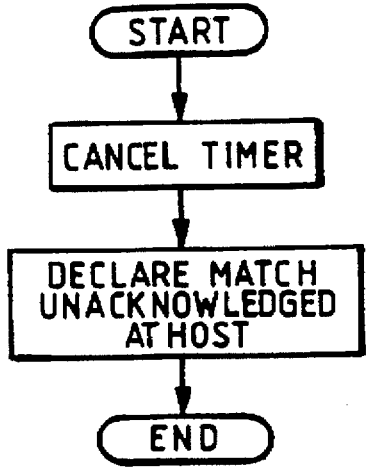

If the timer at the host 200 is not cancelled and reset within a predetermined time, such as preferably 60 seconds, by way of example, a time-out signal with two functions is preferably generated; namely, one to cancel the timer, and the second to activate an alarm A and declare the match as "un-acknowledged" at the host 200. The "un-acknowledged" declaration may, if desired, prompt an operator at the host 200 to take action to check with the respective clients or counterparties to the trade, or the checking may be left to the clients 5 or counterparties to the trade to put in hand themselves, either directly between clients, if they have been made aware of the identity of the other party to the trade or match, or else through the medium of the host 200 if the identity of the other party has not yet been revealed. This is shown, by way of example, in the message flow chart of FIG. 7.

When the clients or counterparties remain unidentified to each other until the match is made and acknowledged, message 4 preferably only contains details of the amount purchased and does not identify the buyer, the details of the buyer preferably only being included in message 9. If desired, message 4 could contain the missing identification data, and this identification could be suppressed by the display until message 9 is received. Similarly, the details of the vendor need not be included in message 6 to the purchaser, preferably being contained, instead, in message 8, or they could be included in message 6 and suppressed until receipt of message 8.

When clients or counterparties are identified to each other at an early stage, subsequent communication, if desired, can be made directly between the counterparties and need not be through the host 200. However, in such an instance, full records of transactions in all stages cannot then normally be made at the host 200, although the resultant direct communication further reduces the chance of transmission failure.

Referring now to FIG. 8, the improved matching system of the present invention shall be described in further detail as a specific improvement on the anonymous matching system described in U.S. patent application Ser. No. 357, 478, now U.S. Pat. No. 5,136,501, issued Aug. 4, 1992, the contents of which has been specifically incorporated by reference herein in their entirety. As shown and preferred in FIG. 8, the transaction desk or T-desk utilized in the anonymous trading system of the above application for risk management has been eliminated and replaced by the improved system of the present invention in which timers 300, 302 are located, by way of example, at the individual client keystations KS A, KS B, respectively, for timing receipt of the "confirmed trade" message and/or ticket generation message from the host 200 in order to generate an alarm condition and display trade status on displays 202, 204, respectively, when the "confirmed trade" message is not timely received within a predetermined period, such as the 15 second time period given by way of example in the discussion of FIG. 1, as well as an unconfirmed trade "status message pending confirmation," or a "late confirmed trade" status message for trades confirmed after this predetermined time period. In addition, the system of FIG. 8 includes the provision of the optional timer 304 at the central host 200 for timing receipt of match acknowledgement signals from the respective keystations KS A, KS B within a predetermined period, such as the 60 second time period given by way of example in the above discussion of FIG. 1. Preferably, in the improved matching system illustrated in FIG. 8, a trading ticket is not released by the host 200 until the host 200 has received the match acknowledgement messages or MATCH-ACK for that match or trade from the counterparties to the trade which, in the example of FIGS. 1 and 8, are keystations KS A and KS B. As shown and preferred in the example of FIG. 8, keystation A or KS A is considered the transaction originating keystation which, in this example, submits a transaction called "bid" to the central host 200, which bid is sent as a "bid notification" anonymously to all keystations in the system at this point and as a "bid acknowledgment" to KS A. Assuming keystation B or KS B has submitted an offer at that price to the central host 200, the central host will recognize that a match is now possible and, assuming that the predetermined matching criteria have been met, such as quantity and gross counterparty credit limit, by way of example, the host 200 will then create a match which is not yet confirmed by the counterparties to the trade and will transmit a "match notification" message to the counterparties involved in the match, such as KS A and KS B in the above example. Upon receipt of the match notification message from the host 200, the respective keystation KS A and/or KS B automatically transmits a match acknowledgement message or MATCH-ACK back to the host 200 and the respective timer, 300, 302, respectively starts timing the elapsed time between transmission of the MATCH-ACK message and receipt back of a "confirmed trade" and/or ticket generation message from the host 200 which should occur within the previously set predetermined time period, such as the 15 seconds given in the above example. Preferably, assuming the host 200 receives the MATCH-ACK messages from all counterparties to the trade, KS A and KS B, it will automatically transmit both "the confirmed trade" message and a ticket generation message to the counterparties which will cause the display 202, 204 to display a "confirmed trade" or a "done" message next to the particular transaction, as well as printing of the corresponding trade ticket by the associated conventional trade ticket printer 306, 308. If, however, the "confirmed trade" and/or ticket generation message is not timely received by the particular counterparty, keystation KS A or KS B in this example, within this predetermined period, then preferably a warning message is displayed on the appropriate display 202, 204 and, if desired, an audible alarm may be sounded at the conventional keyboard 310, 312 used to input data at the respective keystation KS A, KS B, respectively. However, preferably, if the "confirmed trade" message and/or ticket generation message is subsequently received by the keystation KS A or KS B after this predetermined period, such as due to a delay in transmission somewhere in the system, then the trade status message display at the keystation will subsequently display a "late confirmed trade" message, although the warning will have first sounded and/or been displayed at the end of the predetermined interval. Since the timers 300, 302 basically also control the trade status display on the keystation displays 202, 204 in response to changes in the trade status over time, these timers 300, 302 are in effect trade status timers.

As was previously mentioned, the timer 304 at the host 200, times the receipt of the match acknowledgement or MATCH-ACK messages from the counterparty keystations so that if all of the MATCH-ACK messages are not received with a predetermined period after the match has occurred, such as the previously mentioned 60 second period in the above example, no ticket for the match and/or no "confirmed trade" message will be transmitted from the host 200 and the trade will remain in the "unconfirmed" state, and, if desired, an alarm condition will be provided at the host 200.

It should be understood that once the improved procedures employed in the above system are understood, based on the foregoing description, the implementation of these improved procedures in accordance with the message flow diagrams of FIGS. 2–7 will be readily understood by one of ordinary skill in the art and need not be described in further detail hereinafter. Suffice it to say, that by eliminating the transaction desk and placing conventional timing lapse circuitry 300, 302 at the individual keystations KS A, KS B, risk management in an anonymous trading system is significantly enhanced over the type of approach employed in the aforementioned U.S. patent application Ser. No. 357, 478, now U.S. Pat. No. 5,136,501, issued Aug. 4, 1992.

What is claimed is:

1. In a matching system for trading instruments in which bids for said trading instruments are automatically matched against offers for given trading instruments for automatically providing matching transactions in order to provide confirmed trades for said given trading instruments, said system comprising a host computer means for matching like bids and offers provided thereto in accordance with a predetermined matching criteria, a transaction originating keystation means for providing a bid on a given trading instrument to said system for providing a potential matching transaction, a counterparty keystation means for providing an offer on said given trading instrument involved in said potential matching transaction, and network means for interconnecting said host computer means, said transaction originating keystation means, and said counterparty keystation means in said system for enabling data communications therebetween;

said host computer means comprising match notification data message generation means for providing a match notification data message to said transaction originating keystation means and said counterparty keystation means via said network means in response to the occurrence of a matching transaction at said host computer means, said match notification data message comprising an unconfirmed matching transaction for said given trading instrument;

and match acknowledgement data message generation means disposed at each of said keystation means for respectively providing a match acknowledgement data message to said host computer means via said network means in response to receipt of said match notification data message by said transaction originating keystation means and said counterparty keystation means, respectively;

said host computer means further comprising confirmed trade data message generation means for providing a confirmed trade data message to said transaction originating keystation means and said counterparty keystation means via said network means in response to receipt of said match acknowledgement data messages from both said transaction originating keystation means and said counterparty keystation means;

said transaction originating keystation means and said counterparty keystation means each further comprising trade status timing means for timing a duration between transmission of said match acknowledgment data message and an expected receipt of said confirmed trade data message by said respective keystation means for providing a trade status display at said respective keystation means based on said timed receipt of said confirmed trade data message;

whereby the occurrence of automatically confirmed trades is dependent on match acknowledgement from all counterparties to the matching trade.

2. An improved matching system in accordance with claim 1 wherein said trade status timing means further comprises means for timing receipt of said confirmed trade data message by said respective keystation means for providing a confirmed trade status display in response to receipt of said confirmed trade data message by said respective keystation means within a predetermined time interval.

3. An improved matching system in accordance with claim 2 wherein said trade status timing means further comprises means for providing an unconfirmed trade status display during said predetermined time interval.

4. An improved matching system in accordance with claim 3 wherein said trade status timing means further comprises alarm means for providing an alarm condition for said respective keystation means when said confirmed trade data message is not received within said predetermined time interval.

5. An improved matching system in accordance with claim 4 wherein said trade status timing means further comprises means for providing a late confirmed trade status display in response to receipt of said confirmed trade data message after said predetermined time interval.

6. An improved matching system in accordance with claim 5 wherein said trade status timing means further comprises message display means for displaying said trade status display at said respective keystation means.

7. An improved matching system in accordance with claim 6 wherein said trading instruments comprise financial trading instruments.

8. An improved matching system in accordance with claim 1 wherein said trade status timing means further comprises alarm means for providing an alarm condition for said respective keystation means when said confirmed trade data message is not received within a predetermined time interval.

9. An improved matching system in accordance with claim 8 wherein said trade status timing means further comprises means for timing receipt of said confirmed trade data message by said respective keystation means for providing a confirmed trade status display in response to receipt of said confirmed trade data message by said respective keystation within said predetermined time interval.

10. An improved matching system in accordance with claim 9 wherein said trade status timing means further comprises means for providing an unconfirmed trade status display during said predetermined time interval.

11. An improved matching system in accordance with claim 10 wherein said trade status timing means further comprises means for providing a late confirmed trade status display in response to receipt of said confirmed trade data message after said predetermined time interval.

12. An improved matching system in accordance with claim 1 wherein said trade status timing means further comprises message display means for displaying said trade status display at said respective keystation means.

13. An improved matching system in accordance with claim 12 wherein said trade status timing means further comprises alarm means for providing an alarm condition for said respective keystation means when said confirmed trade data message is not received within a predetermined time interval.

14. An improved matching system in accordance with claim 1 wherein said trading instruments comprise financial trading instruments.

15. An improved matching system in accordance with claim 1 wherein said confirmed trade data message generation means further comprises trading ticket data generation means, each of said keystation means further comprising means responsive to receipt of a trading ticket data message from said trading ticket data generation means for automatically providing a trading ticket corresponding to said confirmed trade.

16. An improved matching system in accordance with claim 15 wherein said trade status timing means further comprises alarm means for providing an alarm condition for said respective keystation means when said confirmed trade data message is not received within a predetermined interval.

17. An improved matching system in accordance with claim 16 wherein said host computer means further comprises host alarm means for timing receipt of said match acknowledgement data message from said counterparty keystation means for providing an alert condition data message to said transaction originating keystation means when said match acknowledgement data message is not received from said counterparty keystation means within a predetermined time interval, said transaction originating keystation means alarm means further comprising means responsive to receipt of said alert condition data message for providing an alarm condition for said transaction originating keystation means.

18. An improved matching system in accordance with claim 1 wherein said host computer means further comprises host alarm means for timing receipt of said match acknowledgement data message from said counterparty keystation means for providing an alert condition data message to said transaction originating keystation means when said match acknowledgement data message is not received from said counterparty keystation means within a predetermined time interval.

19. An improved matching system in accordance with claim 18 wherein said trade status timing means further comprises alarm means for providing an alarm condition for said respective keystation means when said confirmed trade data message is not received within a predetermined interval.

20. An improved matching system in accordance with claim 19 wherein said transaction originating keystation means alarm means further comprises means responsive to receipt of said alert condition data message for providing an alarm condition for said transaction originating keystation means.

21. An improved matching system in accordance with claim 1 wherein each of said keystation means further comprises store and print means for storing and printing received messages and their status.

22. An improved matching system in accordance with claim 21 wherein said trade status timing means further comprises alarm means for providing an alarm condition for said respective keystation means when said confirmed trade data message is not received within a predetermined time interval.

23. An improved matching system in accordance with claim 1 wherein each of said keystation means further comprises storage means for storing an initial data message, said match acknowledgement data message generation means comprising means for acknowledging said initial message after storage thereof.

24. An improved matching system in accordance with claim 23 wherein said trade status timing means further comprises alarm means for providing an alarm condition for said respective keystation means when said confirmed trade data message is not received within a predetermined time interval.

25. In an offer matching system comprising a host station, a plurality of client stations respectively connected to the host station by a communication link, said host station comprising means for matching bids and offers provided to said host station by said client stations; wherein each of said client stations comprises timing means for generating an acknowledgement signal for trading messages received at one of said client stations from said host station, said timing means being started in response to receipt of a particular type of trading message at said one client station, said particular type representing a match between said one client station and another of said plurality of client stations; and an alarm at said one client station for generating an alarm signal responsive to said timing means continuing beyond a predetermined time, said predetermined time corresponding to an expected time interval between receipt of said particular type of trading message by said one client station and expected receipt by said one client station of a signal from said host station indicating a confirmed trade between said one client station and another of said plurality of client stations.

26. A system as claimed in claim 25 wherein said particular type of trading message is a trading message received from another client station in response to an offer made from said one client station.

27. A system as claimed in claim 26 wherein said one client station comprises, a status indicator, said status indicator being responsive to the expiration of said predetermined time of said timer device to indicate 'unconfirmed' status and being set to 'confirmed' status by the receipt of another particular type of trading message at said one client station.

28. A system as claimed in claim 25 wherein said particular type of trading message is a trading message from said one client station acknowledging a trading message received from another client station.

29. A system as claimed in claim 28 wherein said one client station comprises a status indicator, said status indicator being responsive to the expiration of said predetermined time of said timer device to indicate 'unconfirmed' status and being set to 'confirmed' status by the receipt of another particular type of trading message at said one client station.

30. A system as claimed in claim 25 wherein said one client station comprises a status indicator, said status indicator being responsive to the expiration of said predetermined time of said timer device to indicate 'unconfirmed' status and being set to 'confirmed' status by the receipt of another particular type of trading message at said one client station.

31. A system as claimed in claim 30 wherein said one client station comprises an alarm operable in response to said unconfirmed status.

32. A system as claimed in claim 31 wherein said one client station comprises a store and print device to store and print received messages and their status.

33. A system as claimed in claim 25 wherein said one client station comprises a store and print device to store and print received messages and their status.

34. A system as claimed in claim 25 wherein said one client station comprises means for storing an initial message, said one client station further comprising means for acknowledging said initial message after storage thereof.

35. A system as claimed in claim 25 wherein said host station comprises a timer being initiated in response to a message received from a client station involved in a transaction and re-settable in response to a message received from an associated client station involved in said transaction.

36. In a matching system for trading instruments in which bids for said trading instruments are automatically matched against offers for given trading instruments for automatically providing matching transactions in order to provide confirmed trades for said given trading instruments, said system comprising a host computer means for matching like bids and offers provided thereto in accordance with a predetermined matching criteria, a transaction originating keystation means for providing a bid on a given trading instrument to said system for providing a potential matching transaction, a counterparty keystation means for providing an offer on said given trading instrument involved in said potential matching transaction, and network means for interconnecting said host computer means, said transaction originating keystation means, and said counterparty keystation means in said system for enabling data communications therebetween;

said host computer means comprising match notification data message generation means for providing a match notification data message to said transaction originating keystation means and said counterparty keystation means via said network means in response to the occurrence of a matching transaction at said host computer means, said match notification data message comprising an unconfirmed matching transaction for said given trading instrument;

and match acknowledgement data message generation means disposed at each of said keystation means for respectively providing a match acknowledgement data message to said host computer means via said network means in response to receipt of said match notification data message by said transaction originating keystation means and said counterparty keystation means, respectively;

said host computer means further comprising confirmed trade data message generation means for providing a confirmed trade data message to said transaction originating keystation means and said counterparty keystation means via said network means in response to receipt of said match acknowledgement data messages from both said transaction originating keystation means and said counterparty keystation means;

said transaction originating keystation means and said counterparty keystation means each further comprising trade status timing means for timing a duration between receipt of said match notification data message and an expected receipt of said confirmed trade data message by said respective keystation means for providing a trade status display at said respective keystation means based on said timed receipt of said confirmed trade data message;

whereby the occurrence of automatically confirmed trades is dependent on match acknowledgement from all counterparties to the matching trade.

37. In an offer matching system comprising a host station, a plurality of client stations respectively connected to the host station by a communication link, said host station comprising means for matching bids and offers provided to said host station by said client stations; wherein each of said client stations comprises timing means for generating an acknowledgement signal for trading messages received at one of said client stations from said host station, said timing means being started in response to receipt of a particular type of trading message at said one client station, said particular type representing a match between said one client station and another of said plurality of client stations; and an alarm at said one client station for generating an alarm signal responsive to said timing means continuing beyond a predetermined time, said predetermined time corresponding to an expected time interval between generation of said acknowledgement signal by said one client station and expected receipt by said one client station of a signal from said host station indicating a confirmed trade between said one client station and another of said plurality of client stations.

38. A keystation for use with a system incorporating a host computer for determining matches of offers and bids between keystations for given trading instruments according to predetermined matching criteria, said host computer communicating with said keystations via a network and sending to said keystations both match notification signals in response to the occurrence of a match determined by said host computer, and trade confirmation signals in response to receipt of acknowledgement signals from said keystations indicating receipt of the match notification signals, said keystation comprising:

receiving means for receiving at least said match notification signals and said trade confirmation signals from said host computer;

output means for providing signals generated by said keystation to at least said host computer; and timing means for timing a duration from the receipt of said match notification signals to an expected receipt of said trade confirmation signals.

39. A keystation as claimed in claim 38, further comprising:

keyboard means for entering data; and display means for displaying information related to at least said match notification signals, said trade confirmations signals, and said data entered via said keyboard means.

40. A keystation for use with a system incorporating a host computer for determining matches of offers and bids between keystations for given trading instruments according to predetermined matching criteria, said host computer communicating with said keystations via a network and sending to said keystations both match notification signals in response to the occurrence of a match determined by said host computer, and trade confirmation signals in response to receipt of acknowledgement signals from said keystations indicating receipt of the match notification signals, said keystation comprising:

receiving means for receiving at least said match notification signals and said trade confirmation signals from said host computer;

output means for providing signals generated by said keystation to at least said host computer;

timing means for timing a duration from providing of said match acknowledgement signals to said host computer and an expected receipt of said trade confirmation signals by said keystation.

41. A keystation as claimed in claim 40, further comprising:

keyboard means for entering data; and display means for displaying information related to at least said match notification signals, said trade confirmations signals, and said data entered via said keyboard means.

42. In a matching system for trading instruments, wherein a host computer matches like bids and offers provided thereto from at least two keystations, said host computer and said keystations being connected via a network; means for preventing the occurrence of broken trades comprising:

notification means in said host computer for notifying said at least two keystations of a match;

acknowledgement means in said keystations for respectively acknowledging to said host computer the notification received from said notification means;

confirmation means in said host computer for confirming to said keystations the acknowledgment received from said keystations;

wherein each of said keystations monitors a duration between an expected receipt time of confirmation received by said keystations and at least one of said notification received by said keystations and said acknowledgement by said keystations.

43. A matching system for trading instruments comprising:

host computer means for matching like bids and offers provided thereto;

a plurality of client keystation means each comprising first timing means, at least a first one of said client keystation means being a transaction originating client keystation means for providing a bid to said host computer means, and at least a second one of said client keystation means being a counterparty keystation means for providing an offer to said host computer means;

network means for providing communication between said host computer means and said plurality of client keystation means;

said host computer means generating a match notification message and transmitting said match notification message via said network means to said transaction originating client keystation means and said counterparty keystation means upon determining the occurrence of a match;

said transaction originating client keystation means and said counterparty keystation means each generating and transmitting a match acknowledgment message to said host computer means via said network means upon receipt of said match notification message;

said host computer means further generating and transmitting a confirmed trade message via said network means in response to receipt of said match acknowledgement message from each of said transaction originating client keystation means and said counterparty keystation;

wherein said first timing means in each of said keystation means measures a duration of time between at least one of said received match notification message and said transmitted match acknowledgement message, and an expected time for receiving said confirmed trade message.

44. The matching system of claim 43, further comprising:

second timing means in said host computer means for timing a duration between transmission of said match notification message and transmission of said confirmed trade message.

45. The matching system of claim 43, further comprising:

second timing means in said host computer means for timing a duration between transmission of said match notification message and receipt of said match acknowledgment message.

46. In a matching system for matching trading instruments in which bids for said trading instruments are automatically matched against offers for said trading instruments supplied by client keystations, said system for automatically providing matching transactions in order to provide confirmed trades for said trading instruments, wherein a host computer matches said offers and bids for said trading instruments according to predetermined matching criteria, said host computer communicating with said client keystations via a network, timing means in said client keystations for timing a duration between a first signal sent to said client keystations from said host computer to indicate the existence of a match and an expected receipt time of a second signal sent by said host computer to said client keystations to verify a confirmed trade.

47. In a matching system for matching trading instruments in which bids for said trading instruments are automatically matched against offers for said trading instruments supplied by client keystations, said system for automatically providing matching transactions in order to provide confirmed trades for said trading instruments, wherein a host computer matches said offers and bids for said trading instruments according to predetermined matching criteria, said host computer communicating with said keystations via a network, timing means in said client keystations for timing a predetermined duration between a first signal sent by said client keystations to said host computer to indicate acknowledgement of a match and an expected receipt time of a second signal sent by said host computer to said client keystations to verify a confirmed trade.

48. A matching system for trading instruments in which bids for said trading instruments are automatically matched against offers for given trading instruments, said matching system comprising:

a host computer for automatically matching like bids and offers provided thereto in accordance with predetermined matching criteria;

a first transaction terminal for providing a bid on a given trading instrument to said host computer;

a second transaction terminal for providing an offer on said given trading instrument to said host computer; and a network for interconnecting said host computer, said first transaction terminal, and said second transaction terminal for enabling data communications therebetween, wherein said host computer transmits an unconfirmed match notification dam message to said first transaction terminal and said second transaction terminal via said network if the bid and the offer for the given trading instrument satisfy the predetermined matching criteria, said first and second transaction terminals each transmit a match confirmation data message to said host computer via said network in response to reception of the unconfirmed match notification data message, said host computer further transmits a confirmed trade data message to said first and second transaction terminals via said network means in response to reception of said match confirmation data messages from both of said first and second transaction terminals, and said first and second transaction terminals each comprise a trade status displaying means for displaying a trade confirmed indication if said confirmed trade data message is received within a predetermined time and for displaying a trade not confirmed indication if said confirmed trade data message is not received within said predetermined time.

* * * * *